United States Patent
Skog et al.

(10) Patent No.: US 8,798,600 B2
(45) Date of Patent: Aug. 5, 2014

(54) DISPLAYING CALLER INFORMATION ON WIRELESS LOCAL NETWORK CONNECTED DEVICE

(75) Inventors: Robert Skog, Hasselby (SE); Justus Petersson, Stockholm (SE)

(73) Assignee: Telefonaktiebolaget L M Ericson (publ), Stockholm (SE)

( * ) Notice: Subject to any disclaimer, the term of this patent is extended or adjusted under 35 U.S.C. 154(b) by 541 days.

(21) Appl. No.: 12/867,653

(22) PCT Filed: Feb. 15, 2008

(86) PCT No.: PCT/SE2008/050187
§ 371 (c)(1),
(2), (4) Date: Aug. 13, 2010

(87) PCT Pub. No.: WO2009/102250
PCT Pub. Date: Aug. 20, 2009

(65) Prior Publication Data
US 2010/0330970 A1    Dec. 30, 2010

(51) Int. Cl.
*H04M 3/34*    (2006.01)

(52) U.S. Cl.
USPC .......................................................... 455/415

(58) Field of Classification Search
CPC ............................ H04M 3/42042; H04M 1/57
USPC ........... 455/415, 418–420, 414.1, 466, 552.1, 455/553.1, 556.1
See application file for complete search history.

(56) References Cited

U.S. PATENT DOCUMENTS

| | | | | |
|---|---|---|---|---|
| 7,693,270 B2 * | 4/2010 | Beck et al. | ............... | 379/142.16 |
| 8,060,068 B1 * | 11/2011 | Mangal | ......................... | 455/415 |
| 8,081,970 B2 * | 12/2011 | Virk | ........................... | 455/432.3 |
| 8,185,139 B1 * | 5/2012 | Mangal | ......................... | 455/466 |
| 8,213,919 B1 * | 7/2012 | Bluhm et al. | ................. | 455/415 |
| 2002/0085540 A1 * | 7/2002 | Hyvarinen et al. | ........... | 370/352 |
| 2004/0052341 A1 * | 3/2004 | Yeh et al. | ................... | 379/88.19 |
| 2004/0162110 A1 * | 8/2004 | Neuhaus | ....................... | 455/557 |

FOREIGN PATENT DOCUMENTS

WO    2007/098155 A2    8/2007

OTHER PUBLICATIONS

3rd Generation Partnership Project. 3GPP TS 31.102, V. 8.0.0 (Dec. 2007), 3rd Generation Partnership Project; Technical Specification Group Core Network and Terminals' Characteristics of the Universal Subscriber Identity Module (USIM) application (Release 8), Dec. 2007.

* cited by examiner

Primary Examiner — Brandon Miller
(74) Attorney, Agent, or Firm — Coats & Bennett, P.L.L.C.

(57) ABSTRACT

A method, a computer program, a computer program product and a user equipment (6) comprising a contacts database (16) and being connected to a telecommunications network (12) and to a displaying device (3) over a wireless local network (5). The method comprises the steps of: wirelessly receiving incoming caller information via the telecommunications network, determining based on the caller information, if there is additional information in the contacts database associated with the caller, determining if the local network is the same as a predefined network, and if the local network is the same as the predefined network perform the steps of: creating a message (19) comprising some of the received caller information and at least some of the additional information, sending the message to the displaying device to enable the displaying device to show the additional information comprised in the message.

20 Claims, 3 Drawing Sheets

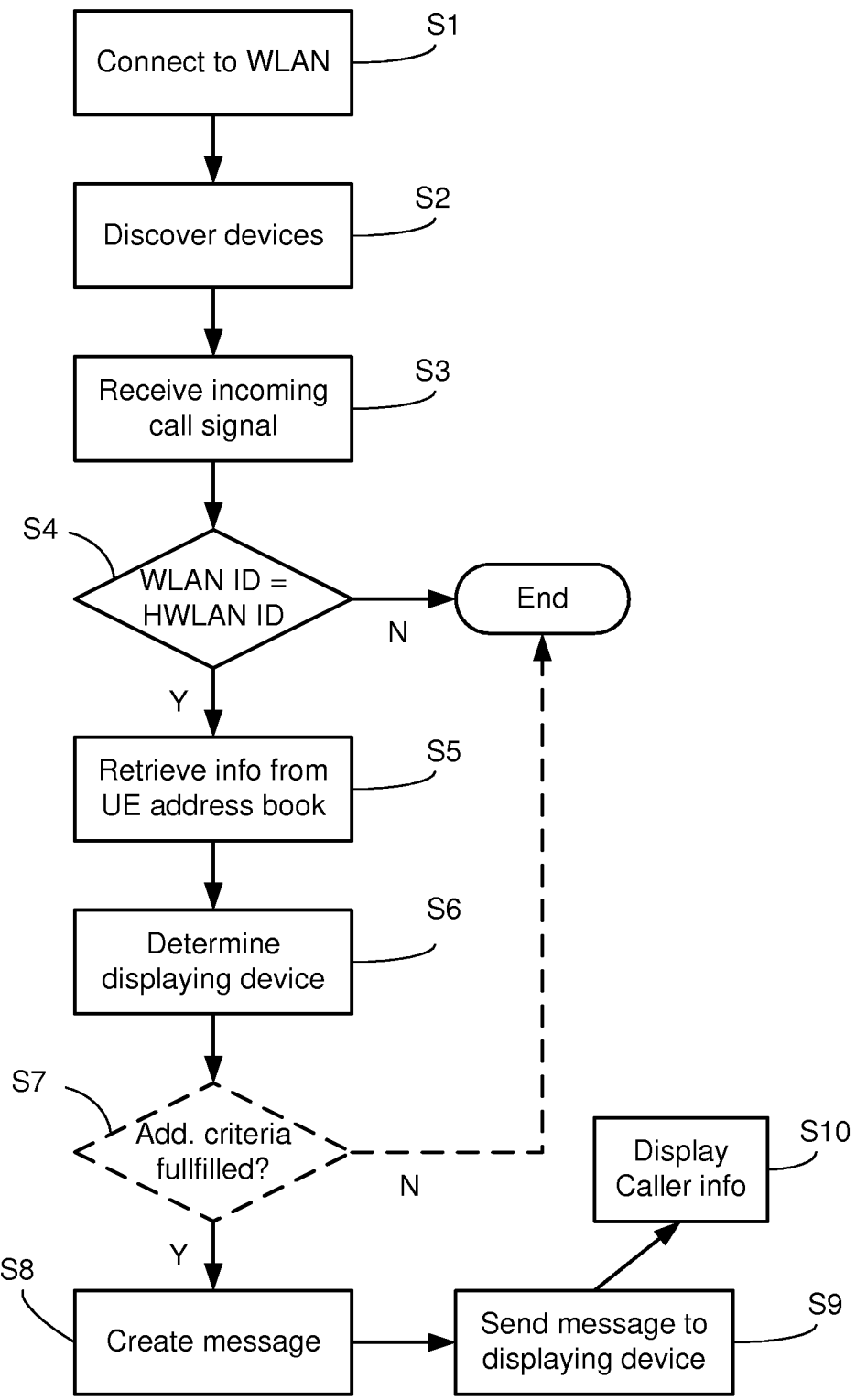

DISPLAYING CALLER INFORMATION ON WIRELESS LOCAL NETWORK CONNECTED DEVICE

TECHNICAL FIELD

The present invention relates to a method, a user equipment, a computer program and a computer program product for enabling caller information to be displayed on a displaying device.

BACKGROUND

Caller ID (Caller Identification) or CNID (calling number identification) is a telephone service that transmits the caller's number to the called party's telephone equipment before the call is answered. Where available, caller ID can also provide a name associated with the calling telephone number. Consumers can today also buy equipment or subscribe to enhanced Caller ID services that show the caller ID on a TV (Television) screen at home when a telephone connected to a PSTN (Public Switched Telephone Network) receives a call provided that a Caller ID service is enabled by a local phone company.

A network architecture called IMS (IP Multimedia Subsystem) has been developed by the 3GPP (3rd Generation Partnership Project) as a platform for handling and controlling multimedia services and sessions, commonly referred to as the IMS network. Thus, an IMS network can be deployed to initiate and control multimedia sessions for IMS-enabled terminals connected to various access networks, regardless of the access technology used. WO-2007/098155-A2 discloses an IMS system interacting with an IPTV system. The disclosed systems enable Caller ID for a caller to an IMS-enabled mobile phone to be displayed on an IPTV. The caller ID is centrally stored in an HSS (Home subscriber Server) as is known in the art and the service is enabled by a specialized service broker function in the IMS network.

Although IMS certainly facilitate new functions and services such as showing Caller ID on a TV screen, it requires new nodes and functionality to be installed in an operator's network and at the moment there are very few persons that have access to IMS-enabled services, e.g. since there currently are few IMS-enabled consumer equipments available on the market for ordinary consumers.

SUMMARY

It is an object of the invention to provide a new way of displaying caller ID on a TV screen.

Another object of the invention is to provide a cheap and user-friendly way of displaying caller ID on a TV screen.

The invention relates to a method for a UE (user equipment), e.g. a mobile communication device, which comprises a contacts database and is connected to a telecommunications network, e.g. a UMTS network, and to at least one displaying device over a wireless local network. The method comprises the steps of:
 wirelessly receiving incoming caller information, e.g. a telephone number associated with the caller, via the telecommunications network,
 determining based on the caller information, if there is additional information in the contacts database associated with the caller information,
 determining if the wireless local network is the same as a predefined network, and if the local network is the same as the predefined network perform the steps of:
 creating a message comprising at least some of the received caller information and, if available in the contacts database, at least some of the additional information,
 sending the message over the wireless local network to the displaying device to enable the displaying device to show at least a part of the additional information comprised in the message.

The wireless local network shall here be interpreted to include any limited local wireless network or private network such as a residential, office or vehicle network, also referred to as e.g. WLAN (Wireless Local Area Network) or WPAN (Wireless Personal Area Network).

Hereby is achieved that, in addition to the ordinary caller ID, additional caller information from the contacts database in the UE easily can be displayed on e.g. a TV screen if the TV is adapted to communicate over the local wireless network and the UE is adapted to communicate over both a telecommunications network and a wireless local network. Moreover, more information may be displayed than a caller's name and the caller's telephone number without having a centralized end user database for storing additional caller information.

The method may comprise the step of sending the message as an image file, e.g. a Joint Photographic Experts Group file, to the displaying device. Hereby is achieved that the message is sent in a widely accepted file format, e.g. in DLNA (Digital Living Network Alliance).

The image file may comprise a picture which is associated with the caller and is stored in the UE. Hereby enhanced and enriched display of caller information is enabled in an easy way.

In one embodiment the method comprises the step of sending the additional information to the displaying device partly comprised in a text message and partly comprised in an image file. Hereby is enabled that caller information suitable to be displayed as text may be sent as text and caller information suitable to be sent as an image may be sent as an image.

In one embodiment the method comprises the step of discovering the displaying device by sending a Hypertext Transfer Protocol Get request in a discovery message. Hereby is achieved that the discovering is adapted for e.g. UPnP (Universal Plug and Play) and DLNA.

The message may in one embodiment of the method be sent directly from the user equipment to the displaying device. Alternatively, in one embodiment the message is sent to the displaying device via a bridging device comprised in the wireless local network. Hereby is achieved that a message may be sent via one wireless interface, e.g. IEEE (Institute of Electrical and Electronics Engineers)802.15, of the UE, translated in the bridging unit into another wireless interface, such as an IEEE 802.11 standard and then forwarded to the displaying device via IEEE 802.11.

The method may comprise the step of enabling a user of the user equipment to manually define in the user equipment the predefined local network before the incoming caller information is received. Hereby is achieved that the user decides in which local networks the caller information shall be displayed on displaying devices.

The method also relates to a computer program for the user equipment, e.g. a mobile communication device, which comprises a contacts database and is connected to a telecommunications network, e.g. a UMTS network, and to at least one displaying device over a wireless local network. The computer program comprises code means which when run on the user equipment causes the user equipment to:
 determine if the local network is the same as a predefined network, determine based on incoming caller information, e.g. a telephone number associated with the caller, received wirelessly via the telecommunications network, if there is additional information in the contacts database associated with the caller information, and, if the local network is the same as the predefined network when the caller information is received by the user equipment, to:

create a message comprising at least some of the received caller information and, if available in the contacts database, at least some of the additional information, send the message over the wireless local network to the displaying device to enable the displaying device to show at least a part of the additional information comprised in the message.

The message may be created as an image file, e.g. a Joint Photographic Experts Group file, comprising, if available, a stored picture associated with the caller in the user equipment.

Furthermore, the invention relates to a computer program product comprising the computer program and a computer readable medium on which the computer program is stored. The computer program product may be a flash memory or an EEPROM (Electrically Erasable Programmable Read-Only Memory).

Moreover, the invention relates to a user equipment, e.g. a mobile communication device, comprising:

a contacts database, a telecommunications interface for communications with a telecommunications network, a communications interface for communications with a wireless local network, determining means to determine if the local network is the same as a predefined network when incoming caller information, e.g. a telephone number associated with the caller, is received wirelessly via the telecommunications network, and to determine based on the incoming caller information if there is additional information in the contacts database associated with the caller information, message creation means for creating a message comprising at least some of the received caller information and, if available in the contacts database, at least some of the additional information, and communications means for sending the message over the wireless local network via the communications interface to the displaying device to enable the displaying device to show at least a part of the additional information comprised in the message.

In one embodiment, the determining means, the message creation means and the communication means are implemented as the computer program that causes the UE to perform the steps of the embodiments of the method.

The user equipment may be adapted for communication with the displaying device according to an Institute of Electrical and Electronics Engineers 802.11 standard, IEEE 802.15 standard or IEEE 802.16 standard.

The user equipment may be adapted for communication with the displaying device via Hypertext Transfer protocol messages.

The message creation means may be adapted to create the message as an image file, e.g. a Joint Photographic Experts Group file, comprising, if available, a stored picture associated with the caller in the user equipment.

BRIEF DESCRIPTION OF THE DRAWINGS

The objects, advantages and effects as well as features of the present invention will be more readily understood from the following detailed description of exemplary embodiments of the invention when read together with the accompanying drawings, in which:

FIG. 4 is a flow chart illustrating an embodiment of presenting caller information on a displaying device.

DETAILED DESCRIPTION

Figure 1:
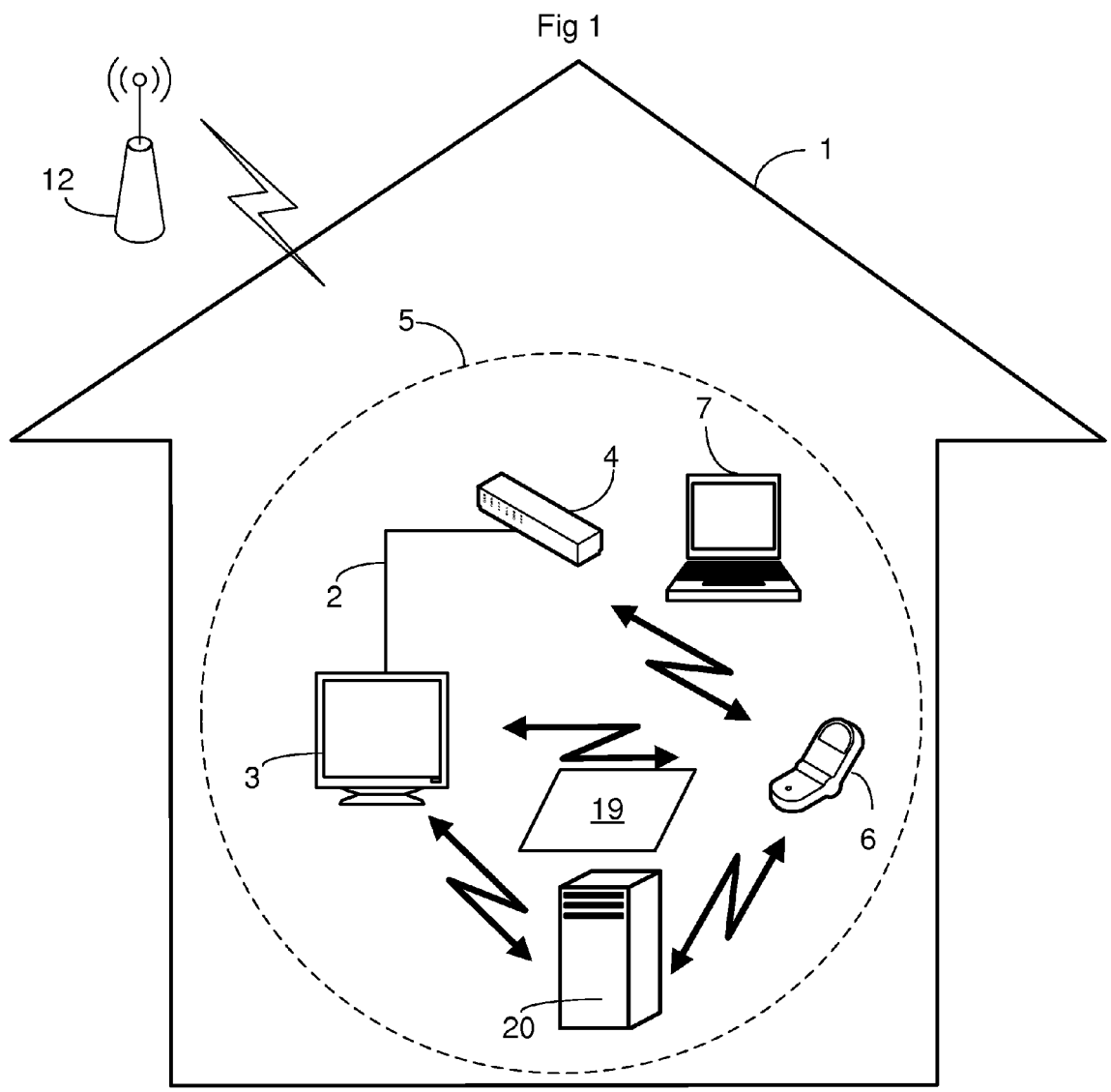
FIG. 1 shows a schematic view of an exemplary local network in which the invention is applicable.

While the invention covers various modifications and alternative constructions, embodiments of the invention are shown in the drawings and will hereinafter be described in detail. However it is to be understood that the specific description and drawings are not intended to limit the invention to the specific forms disclosed. On the contrary, it is intended that the scope of the claimed invention includes all modifications and alternative constructions thereof falling within the spirit and scope of the invention as expressed in the appended claims.

FIG. 1 discloses a local network in the form of a LAN (Local Area Network), typically residing inside a household 1, but may also be e.g. a LAN within a company building/-s and a local network in a vehicle. A home local network, i.e. a local network at home, may comprise a wired connection 2 between some devices in the home local network, which here is illustrated by an Ethernet cable connection between a displaying device 3 in the form of e.g. a TV unit, an IPTV unit with an STB (Set-Top Box) or a PC (Personal Computer) monitor, and an access point device 4 in the form of e.g. a wireless RGW (Residential Gateway) and Wi-Fi™ router. The access point device 4 is typically connected to the Internet, although that is not necessary according to the invention In addition to, or instead of the wired connection 2, devices in the local network are connected to each other via interfaces in a wireless local network 5 in the form of a WLAN or WPAN, e.g. interfaces compatible with IEEE 802.11, IEEE 802.15 or IEEE 802.16 standards, thus forming a LAN part referred to as a HWLAN (Home Wireless LAN) in the following description. This is illustrated with wireless links between a UE 6, here in the form of a mobile phone, and the TV unit and the RGW respectively. The UE 6 may within the invention of course also be e.g. a computer in the form of a laptop 7 or a PDA (Portable Digital Assistant).

Figure 2:
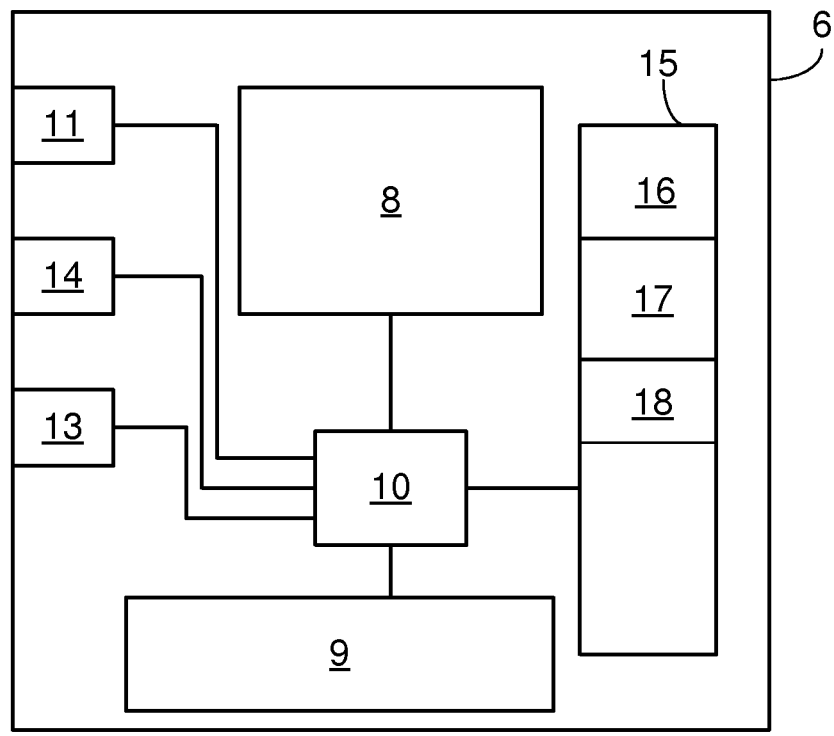
FIG. 2 is a schematic view of a UE (User Equipment) according to an embodiment of the invention.

FIG. 2 shows very schematically an embodiment of the UE 6. Comprised in the UE 6 are a display 8, inputting means 9 in the form of e.g. buttons, a processing unit 10 including DSP (Digital Signal Processor) and encoding and decoding modules, a telecommunications interface 11 in the form of a transceiver unit comprising at least one antenna and amplifier adapted for communication with units in a telecommunications network 12 (see FIG. 1), e.g GSM (Global System for Mobile communications) and/or UMTS (Universal Mobile Telecommunications Standard). The UE 6 also comprises a communications interface 13 for communication in the wireless local network 5, here in the form of a transceiver adapted for wireless communication with IEEE 802.11 and/or a transceiver 14 adapted for IEEE 802.15. Furthermore the UE 6 comprises at least one computer program product 15 in the form of a non-volatile memory, e.g. an EEPROM and a flash memory. The memory comprises a contacts database 16, a computer program 17 being a presence service application and a local network identity database 18 or data storage for storing network names or other information that can be used to identify predefined wireless local networks in a manner to be further discussed below. Although the local network identity database 18 and the contacts database 16 may be separate software in the shown embodiment, they may of course be computer program modules of the presence service application. The contacts database 16 may also be a part of a PIM (Personal Information Manager) software. Furthermore, the presence service application may of course be stored on a different memory than e.g. the contacts database 16. The contacts database 16, often also called e.g. "phone book" if in a mobile phone, "contact list" and "address book", comprises contact details about persons and/or organizations, e.g. first name, last name, job title, company name, company department, postal addresses, telephone number, e-mail address, fax number, mobile phone number, picture of e.g. the caller, URL (Uniform Resource Locator) to home page and birthday date of the caller. Several embodiments of the contacts database 16 are known to a person skilled in the art and are therefore not described more in detail.

Figure 3:
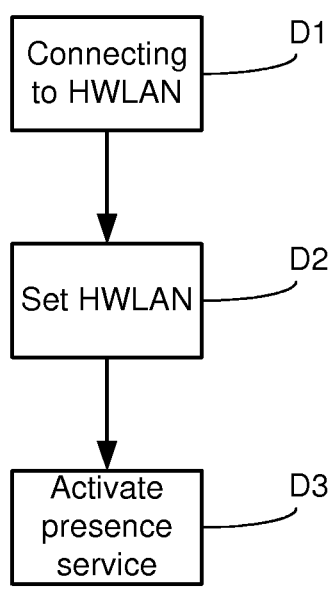
FIG. 3 is a flow chart of an embodiment of activating a presence service.

FIG. 3 discloses an embodiment of a method to activate a presence service. A transceiver of the access point device 4 continuously generates a signal message indicating that the HWLAN is activated. The signal message comprises a BSSID (Basic Service Set Identifier) as is known in the art. The BSSID is a unique identifier related to a MAC (Media Access Control) address of the access point device. In a first step D1 the signal message is received by the UE 6 when within the signaling range of the access point device 4. The signal message indicates to the UE 6 the presence of the signal message through the BSSID, which also can be shown to a user of the UE 6 via a GUI (Graphical User Interface) in the display 8. In a second step D2 the HWLAN is set, i.e. saved, as a first predefined WLAN in the memory, i.e. in the local network identity database 18. The first predefined WLAN can therefore be said as being the HWLAN of the UE user. Another WLAN may also be set as a second predefined WLAN in the case where the presence service shall be activated in different WLANs, e.g. in the HWLAN at home and another WLAN at work and in a WPAN in a vehicle. The GUI may be used to set the HWLAN as the first predefined WLAN by, e.g. displaying a text message on the UE 6 with the essential content of "New WLAN discovered. Do you want to set it as one of your home WLANs and automatically connect to it whenever you are in reach?" If the user is e.g. at home he/she pushes a "Yes" button to save the HWLAN in the memory. Alternatively, the GUI may comprise an interface where the user directly can input and store the HWLAN including any security keys as the first predefined WLAN if the BSSID is known to the user, even if the UE has not discovered the HWLAN.

In a third step D3 the presence service is activated. Presence service shall here be understood as a service that automatically is performed when the UE 6 is connected to a certain wireless local network and can be termed as e.g. an "at home service", an "at work service" and "in vehicle service". The presence service application in the UE 6 may in one embodiment comprise code means for a GUI for letting the user activate or deactivate the presence service and associate the presence service to at least one of the predefined WLAN: s; in this example including the HWLAN saved in the second step D2. Furthermore, the GUI may in some embodiments let the user define and store other criteria and features for the presence service, as will be more readily understood and explained in the description further down.

Having described embodiments of how the HWLAN may be set and a presence service according to the invention may be activated, embodiments of the presence service itself will be described in more detail in conjunction with FIG. 4.

In a first step S1 in FIG. 4 the UE 6 is connected to a wireless local network 5 within reach of the communication interface 12 in any of the ways known to a person skilled in the art and is therefore not described more in detail as this is as such known.

In a second step S2 the UE 6 discovers at least one displaying device 3 such as the TV and other video displays, in the WLAN. In one embodiment this is achieved with a DLNA/UPnP discovery and description method. UPnP is an architecture, developed in a multi-vendor collaboration called the UPnP Forum, for establishing standardised device protocols for the communication between different IP devices in a local network using different access technologies, operating systems, programming languages, format standards and communication protocols. UPnP further provides standardised methods to describe and exchange device profiles that may include capabilities, requirements and available services in the devices. UPnP and other protocols support a process called "discovery" (or "pairing") in which a device can join a local network, obtain a local IP address, announce its name and IP address, and exchange capabilities and services with other devices within the local network. DLNA is a collaboration between companies to create design guidelines for products so that they can work together in a standardized way, e.g. for storing and accessing digital media content from devices in a local network such as a LAN or PAN. The UPnP protocol is utilised by DLNA as an underlying protocol for communication between devices within local networks.

Using DLNA/UPnP terminology, the UE 6 acts as a UPnP control point and a DMS (Digital Meida Server) and uses UPnP messages to discover what devices that are in reach, i.e. on the same WLAN. This can typically be done by multicasting data about the UE 6 to the other devices or sending a request to the other devices about their capabilities. This is achieved e.g. using SSDP (UPnP Discovery Protocol). Discovered devices may be e.g. DMS (Digital Media Servers) in the form of e.g. PCs (Personal Computers) and NAS (Network Attached Storage) to store content and make the content available to DMPs (Digital Media Players). The displaying devices are in this embodiment known to a person skilled in the art as DMRs (Digital Media Renderers), which also are discovered in this step. The discovering process using UPnP is as such known to a person skilled in the art and therefore not described more in detail.

In another embodiment of the second step S2 discovery of the displaying device 3 is conducted within a PAN, using Bluetooth communication instead of any of the IEEE 802.11 standards. A proper way to do this is also known to a person skilled in the art since Bluetooth™ pairing also is specified by DLNA and Bluetooth Special Interest Group and is implemented in consumer equipment for sale.

In a third embodiment of the second step S2 discovery of the displaying device is made by a Zero Configuration Networking solution known to a person skilled in the art, e.g. a solution which uses multicast DNS (Domain Name System) and DNS Service Discovery.

In a fourth embodiment of the second step S2 discovery of the displaying device is conducted within a wireless local network according to any of the IEEE 802.16 standards.

Other embodiments of the second step S2 are also conceivable, such as using a discover process according to an Infrared technology standard or using an optional camera in the UE 6 to photograph a QR (Quick Response) code for the displaying device 3 and with reader software in the UE 6 make the UE 6 discover the displaying device 3. However, in the latter case an IP (Internet Protocol) address has to be included in the QR code.

In a third step S3 the UE 6 receives an incoming call comprising caller information including at least the telephone number of the caller. The call signals may be sent according to e.g. an UTMS or GSM standard.

In a fourth step S4 the presence service application causes the UE 6 to determine if the WLAN ID, e.g. the BSSID, is the same as any of the predefined WLAN IDs stored in the UE, e.g. the HWLAN. If the WLAN ID is not the same as any of the predefined WLAN IDs, no further actions are taken. If the WLAN ID is the same as any one of the predefined WLAN IDs, in this example the ID of the HWLAN, a fifth step S5 is started.

In the fifth step S5 the presence service application causes the UE 6 to look up the contacts database 16 to determine if there is some more information about the caller other than information associated with the caller that could be derived directly from incoming signals from the telecommunications network 12. Such additional information may e.g. be any of the above mentioned information in the contacts database 16. An API (Application Programming Interface), which e.g. uses LDAP (Lightweight Directory Access Protocol), may be used by the presence service application to communicate with and retrieve information from the contacts database 16.

In a sixth step S6 the presence service application determine if there is any displaying device connected to the HWLAN. In the case of DLNA/UPnP utilization, the presence server application can determine from a device list if there is a DMR connected to the HWLAN and the capability of the DMR. A UPnP device description is pre-written by the device vendor, and is typically expressed in XML syntax and based on a standard UPnP Device Template produced by the UPnP Forum working committee. To retrieve a UPnP device description of the displaying device 3 the UE may issue an HTTP GET request on the URL in a discovery message, and the displaying device 3 returns the device description. Retrieving a UPnP service description is a similar process that uses a URL within the device description.

In an optional seventh step S7, which could be utilized in some embodiments, it is determined if at least one predetermined criterion in addition to the one in the fourth step S4 is fulfilled in order to continue to an eight step S8. The predetermined criterion in the seventh step S7 may be whether or not a predefined displaying device or device model is present in the HWLAN. Hereby is achieved that a user in advance can pinpoint/predetermine specific displaying devices, even different displaying devices for the different predetermined WLAN:s, that shall receive caller information from the UE 6, so that not all displaying devices in the HWLAN have to show the caller information. Another criterion of the seventh step S7 may be to check whether or not the time is within a predefined time interval. Hereby is achieved that caller information may be shown on displaying devices in the HWLAN only during e.g. office hours, within a predefined number of hours from the activation of the presence service application or only at specific days, such as working days. Yet another criterion of the seventh step S7 may be to determine if the caller is a predetermined caller for which the presence service shall provide the caller information on the displaying device 3. Hereby is achieved that the user of the presence server can differentiate between different persons and situations regarding the expected importance of quickly getting in contact with the caller.

In the eighth step S8 at least one message 19 comprising caller information to the displaying device 3 is created by the UE 6 through the presence service application. The message 19 comprises in one embodiment all available caller information received from the contacts database as well as the caller ID received by the UE 6 from the telecommunications network. Hence, if no extra information associated with the caller has been found in the contacts database, the message only contains the information received from the caller. In another embodiment the message, in addition to the information received from the caller, only comprises extra caller information, if existing, from a limited number of fields in a record associated with the caller in the contacts database 16. The determination of fields to be included in the message 19 is in one embodiment determined by the user of the UE 6 via a GUI presented in the display 8 by the presence service application.

The message 19 is in one embodiment prepared and sent as a text message, e.g. where only caller information that typically is presented as text is retrieved from the contacts database 16. The message 19 is in another embodiment prepared as a picture, e.g. a JPEG (Joint Photographic Experts Group), TIFF (Tagged Image File Format), GIF (Graphics Interchange File Format) and PNG (Portable Network Graphics) image, including text and suitably also a picture of the caller if present in the contacts database 16. In yet another embodiment one text message and a picture message is prepared, the picture message being essentially only the picture of the caller in the contacts database 16 and the text message comprising all the other caller information determined to be sent to the displaying device 3. Messages prepared in the eighth step S8 shall of course be displayable by the displaying device 3 and as implicitly stated above the UE 6 already in the second step S2 has received the message types/formats that can be displayed by the displaying device 3. In still another embodiment the message is prepared as a video stream, e.g. in the video formats MPEG-2 (Moving Picture Experts Group 2), MPEG 4, MPEG-4 AVC (MPEG-4 Advanced Video Coding), VC-1, H.263 and MPEG-4 part 2. Furthermore, any image, text and video message according to the eighth step S8 may be created in conjunction with an audio message, e.g. in the MP3 and AMR (Adaptive Multi-Rate) format.

In a ninth step S9 the UE 6 transmit/streams the message/image/video and/or the audio message to the displaying device 3. This can be done using any standard messaging technique, such as standard HTTP (Hypertext Transfer Protocol) messages used e.g. by DLNA or any HTTP extension for notification according to CEA-2014. In the case where the displaying device 3 is adapted for communication via SIP (Session Initiation Protocol), the message could be sent as a SIP MESSAGE provided that the message is a text message.

In a tenth step S10 the displaying device 3 receives the message 19 and displays the caller information. There are several ways to display the caller information known to a person skilled in the art, such as displaying all the received caller information on only a small part of a display of the displaying device 3. Another way is to only show a small icon indicating only the incoming call or only a part of the caller information and requiring the user to push a button on a remote control to see all the received caller information. In the case of e.g. a DLNA certified displaying device no adaptation of the displaying device 3 is required as such for receiving the message 19, since a message should not be sent to the displaying device if the UE 6 does not already know that the displaying device 3 is capable of receiving and displaying the content of the message 18.

Although several different embodiments of the steps S1-S10 are disclosed in conjunction with FIG. 4 in subsequent order, it must be understood that these individual steps may in other embodiments be performed in numerous other orders. The sixth step S6 may, for example, be performed directly after the actions of any one of the second to fifth step S2-S5 or after the actions of the eighth or ninth step, S8 and S9 respectively. The checking and determination of the seventh step S7 may, for example, be performed before the fifth step S5. The fourth step S4 may of course also be performed before the third step S3 and/or the second step S2.

Also, even though the wireless transmission of caller information from the UE 6 to the displaying device 3 is performed directly between them, there are use cases and combinations of UEs and displaying devices wherein direct communication between the UE 6 and the displaying device 3 is not preferred or appropriate. Such examples are when the UE lacks sufficient processing power or encoders for different image and video formats or when the UE 6 and displaying device 3 differ in their network connectivity. For these cases, some embodiments of the invention comprise a bridging unit 20 (see FIG. 1) in the HWLAN for bridging between different link-layer bearers as well as content transformation. Using the example of a DLNA terminology, such a bridging unit is within the device class MIU (Media Interoperability Unit) and/or M-NCF (Mobile Network Connectivity Function).

The invention claimed is:

1. A method operative in a user equipment comprising a contacts database, the user equipment being connected to a wireless telecommunications network and to at least one displaying device over a wireless local network, the method comprising:
   wirelessly receiving incoming caller information via the telecommunications network;
   determining, based on the caller information, if there is additional information in the contacts database associated with the caller information;
   determining if the wireless local network is the same as a predefined network;
   if the local network is the same as the predefined network, creating a message comprising at least some of the received caller information and, if available in the contacts database, at least some of the additional information; and
   if the local network is the same as the predefined network, sending the message over the wireless local network to the displaying device to enable the displaying device to show at least a part of the additional information in the message;
   wherein if the local network is not the same as the predefined network, the message comprising at least some of the received caller information is not created and sent to the displaying device.

2. The method of claim 1, wherein the incoming caller information comprises a telephone number associated with the caller.

3. The method of claim 1, wherein sending the message comprises sending the message as an image file.

4. The method of claim 3, wherein the image file is a Joint Photographic Experts Group file.

5. The method of claim 3, wherein the image file comprises a picture associated with the caller and being stored in the user equipment.

6. The method of claim 1, wherein sending the message comprises sending the message with the additional information partly comprised in a text message and partly comprised in an image file.

7. The method of claim 1, further comprising discovering the displaying device by sending a Hypertext Transfer Protocol Get request in a discovery message.

8. The method of claim 1, wherein the message is sent directly from the user equipment to the displaying device.

9. The method of claim 1, wherein the message is sent to the displaying device via a bridging device comprised in the wireless local network.

10. The method of claim 1, further comprising enabling a user of the user equipment to manually define in the user equipment the predefined local network before the incoming caller information is received.

11. A non-transitory computer readable medium including program logic executable in a user equipment, the user equipment including a contacts database, the user equipment being connected to a wireless telecommunications network and being further connected to at least one displaying device over a wireless local network, the program logic operative to cause circuits in the user equipment to:
   determine if the local network is the same as a predefined network;
   determine based on incoming caller information received wirelessly via the telecommunications network, if there is additional information in the contacts database associated with the caller information; and
   if the local network is the same as the predefined network when the caller information is received by the user equipment, create a message comprising at least some of the received caller information and, if available in the contacts database, at least some of the additional information; and
   if the local network is the same as the predefined network when the caller information is received by the user equipment, send the message over the wireless local network to the displaying device to enable the displaying device to show at least a part of the additional information comprised in the message;
   wherein if the local network is not the same as the predefined network, the message comprising at least some of the received caller information is not created and sent to the displaying device.

12. The non-transitory computer readable medium of claim 11, wherein the incoming caller information comprises a telephone number associated with the caller.

13. The non-transitory computer readable medium of claim 11, wherein the message is created as an image file comprising, if available, a stored picture associated with the caller in the user equipment.

14. The non-transitory computer readable medium of claim 13, wherein the image file is a Joint Photographic Experts Group file.

15. A user equipment, comprising:
   a contacts database;
   a telecommunications interface operative to communicate with a telecommunications network;
   a communications interface operative to communicate with a wireless local network; and
   a processor operative to:
      determine if the local network is the same as a predefined network when incoming caller information is received wirelessly via the telecommunications network;
      determine, based on the incoming caller information, if there is additional information in the contacts database associated with the caller information;
      create a message comprising at least some of the received caller information and, if available in the contacts database, at least some of the additional information; and direct the communications interface to send the message over the wireless local network to the displaying device to enable the displaying device to show at least a part of the additional information comprised in the message;

wherein if the local network is not the same as the pre-defined network, the message comprising at least some of the received caller information is not created and sent to the displaying device.

16. The user equipment medium of claim 15, wherein the incoming caller information comprises a telephone number associated with the caller.

17. The user equipment of claim 15, wherein the processor is further operative to enable a user of the user equipment to manually predefine a local network.

18. The user equipment of claim 15, wherein the communications interface is operative to communicate with the displaying device according to an Institute of Electrical and Electronics Engineers (IEEE) standard selected from the group consisting of IEEE 802.11, IEEE 802.15, and IEEE 802.16.

19. The user equipment of claim 15, wherein the communications interface is operative to communicate with the displaying device via Hypertext Transfer protocol messages.

20. The user equipment of claim 15, wherein the processor is operative to create the message as an image file comprising, if available, a stored picture associated with the caller in the user equipment.

* * * * *

UNITED STATES PATENT AND TRADEMARK OFFICE
CERTIFICATE OF CORRECTION

| | | |
|---|---|---|
| PATENT NO. | : 8,798,600 B2 | Page 1 of 1 |
| APPLICATION NO. | : 12/867653 | |
| DATED | : August 5, 2014 | |
| INVENTOR(S) | : Skog et al. | |

It is certified that error appears in the above-identified patent and that said Letters Patent is hereby corrected as shown below:

Title page, item (73), under "Assignee", in Column 1, Line 1, delete "Ericson" and insert -- Ericsson --, therefor.

In the Specification

In Column 6, Line 5, delete "interface 12" and insert -- interface 13 --, therefor.

In Column 6, Line 33, delete "Meida" and insert -- Media --, therefor.

In Column 8, Line 64, delete "message 18." and insert -- message 19. --, therefor.

In the Claims

In Column 11, Line 10, in Claim 16, delete "equipment medium" and insert -- equipment --, therefor.

Signed and Sealed this
Fourth Day of August, 2015

Michelle K. Lee
*Director of the United States Patent and Trademark Office*